United States Patent [19]

Ranger

[11] 4,059,158

[45] Nov. 22, 1977

[54] ROCK AND ROOT PICKER

[76] Inventor: Clifford A. Ranger, R.R. No. 1, Lloydminster, Alberta, Canada

[21] Appl. No.: 457,653

[22] Filed: Apr. 3, 1974

[30] Foreign Application Priority Data

Nov. 16, 1973 Canada .................................. 185971

[51] Int. Cl.² ........................................... A01B 43/00
[52] U.S. Cl. .................................................... 171/63
[58] Field of Search ....................... 171/63, 64, 65, 19; 56/328 R, 220, 221; 37/2 R

[56] References Cited

U.S. PATENT DOCUMENTS

| 47,566 | 5/1865 | Quimby | 171/63 |
|---|---|---|---|
| 312,237 | 2/1885 | Weatherbee | 171/63 X |
| 2,795,920 | 6/1957 | Steuerwald | 56/221 |
| 3,356,158 | 12/1967 | Deaver et al. | 171/63 |
| 3,431,979 | 3/1969 | Gregerson | 171/63 |

FOREIGN PATENT DOCUMENTS

| 657,865 | 2/1963 | Canada | 171/63 |
|---|---|---|---|
| 762,676 | 7/1967 | Canada | 171/63 |

Primary Examiner—Russell R. Kinsey
Attorney, Agent, or Firm—Johnson & Hicks

[57] ABSTRACT

The present invention relates to rock and root pickers. The picker disclosed in this application consists of a mobile vehicle with a fork table mounted thereon for movement between a picking position wherein it skims rocks from a surface over which the vehicle is moving and a dumping position wherein the fork table is positioned upwardly from the surface. A rotary reel is also mounted on the vehicle forwardly of the fork table to engage small rocks and roll them rearwardly onto the fork table. A dump bucket is mounted on the vehicle rearwardly of the fork table and receives rocks from the fork table when it is raised. In a preferred embodiment the vehicle is a self propelled swather and the rock picker is an attachment that is mounted on the vehicle in place of the header thereof.

2 Claims, 4 Drawing Figures

ROCK AND ROOT PICKER

FIELD OF THE INVENTION

The present invention relates to rock and root pickers and more particularly to those mechanisms that are used for removing rocks and roots from the surfaces of agricultural fields. In the following description the present mechanism will be referred to as a "rock picker" although it is to be understood that its utility also extends to the picking of other solid objects, i.e. roots or the like, from ground surfaces.

BACKGROUND OF THE INVENTION

In the past, various forms of rock pickers have been proposed. In one very old form of such a device the picker consists of a vehicle having a driven reel, a fork table positioned forwardly of the reel and a bucket positioned forwardly of the fork table. In operation, the reel is rotated at great speed to impell rocks forwardly over the fork table and into the bucket. A rock picker of this nature is disclosed in Canadian Pat. No. 21,884 issued June 15, 1885 to B. A. Weatherbee. This type of mechanism has fallen into discuse since it was only capable of picking up small rocks and because the impeller reel arrangement was prone to miss many of the rocks that were being picked up.

In recent years the majority of rock pickers that have been proposed consist of a vehicle with a fork table mounted so as to skim rocks from a ground surface as the picker proceeds over the surface. These pickers conventionally include a lifting mechanism for the fork table arranged to move the table from its skimming position to a dumping position so as to dump collected rocks from the table into a bucket also carried by the vehicle. Additionally, bucket dumping mechanisms have been provided in these devices to empty the bucket when it became full. One rock picker of this type is disclosed in Canadian Pat. No. 692,573 issued Aug. 18, 1964 to John C. Schindelka. The major disadvantage of this type of rock picker is that it can only skim rocks of certain sizes that are fully above the ground surface. If, for example, one wished to remove small rocks from a ground surface in which they are imbeded it would not be possible to simply skim them from the surface.

SUMMARY OF THE INVENTION

It is an object of the present invention to provide an improved rock and root picker.

In accordance with the present invention there is provided a rock picker for use in conjunction with a vehicle. The rock picker includes a fork table mounted on the vehicle and adapted to skim rocks from a surface on which the vehicle is supported when the vehicle is moving in a forward direction. A rotary reel is mounted on the vehicle at a position forwardly of the fork table for rotation about an axis extending transversely of the direction of movement of the vehicle. Reel drive means rotate the reel so as to sweep the reel fingers rearwardly over the ground surface so as to engage rocks on the surface and roll them rearwardly onto the fork table. It is possible, with such an arrangement, to pick rocks not only of very small size, for example, 2½ inches in diameter but also rocks that are very large and very heavy, for example, up to 500 pound boulders.

In a preferred embodiment of the present invention the rock picker comprises an attachment for a swather, the attachment being specifically designed to replace the swather header. With this preferred embodiment the picker includes a lifting fork table, a dumping bin for receiving rocks from the table and dumping them into piles when full, and a liftable reel for rolling the rocks onto the table. All of the lifting mechanisms and the reel drive mechanism can be driven from the conventional hydraulics of the swather.

BRIEF DESCRIPTION OF THE DRAWINGS

In the accompanying drawings which illustrate an embodiment of the invention.

DESCRIPTION OF THE PREFERRED EMBODIMENTS

As hereinbefore mentioned, one preferred embodiment of the invention comprises an attachment for a self propelled swather. An embodiment of this nature is illustrated in the accompanying drawings and will be described hereinbelow. It is to be understood however, that the rock picker of the present invention can be constructed as a separate mobile vehicle or as an attachment for a mobile vehicle.

Figure 1:
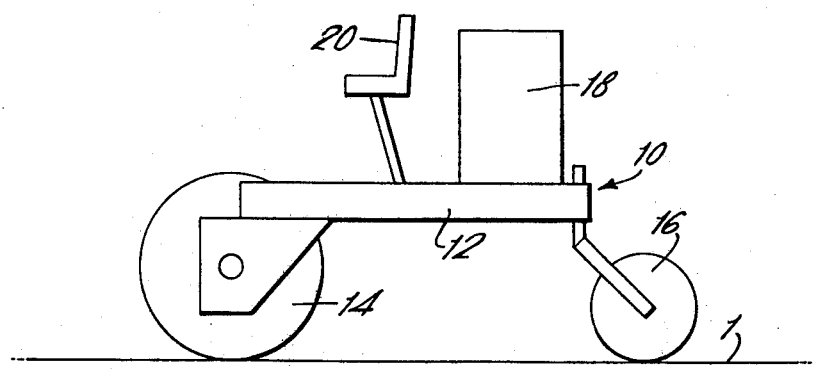
FIG. 1 is a schematic elevation of a swather with the header removed.

Referring to FIG. 1 there is illustrated a self propelled vehicle 10 of conventional type. The vehicle includes a platform 12, a pair of front drive wheels 14 (one shown) and a rear caster wheel 16 supporting the vehicle 10 on a ground surface 1. A motor 18 is mounted on the platform 12 and is connected to the drive wheels 14 through separate power trains (not shown). An operator's seat 20 is supported on platform 12 forwardly of motor 18.

The vehicle illustrated in FIG. 1 is conventionally used with a header attached thereto to provide a swather. The header is normally positioned between front drive wheels 14 and normally projects forwardly from the vehicle. As will be understood by those acquainted with this type of machine, swathers of this type include a header main drive, driven from the motor 18 for driving the swather header, a pair of hydraulic cylinders for lifting the swather header, and a further pair of hydraulic cylinders for lifting the reel that forms part of the swather header. Appropriate controls for these elements are, of course, provided as part of the swather. These elements are of conventional type and accordingly will not be described in detail.

Figure 2:
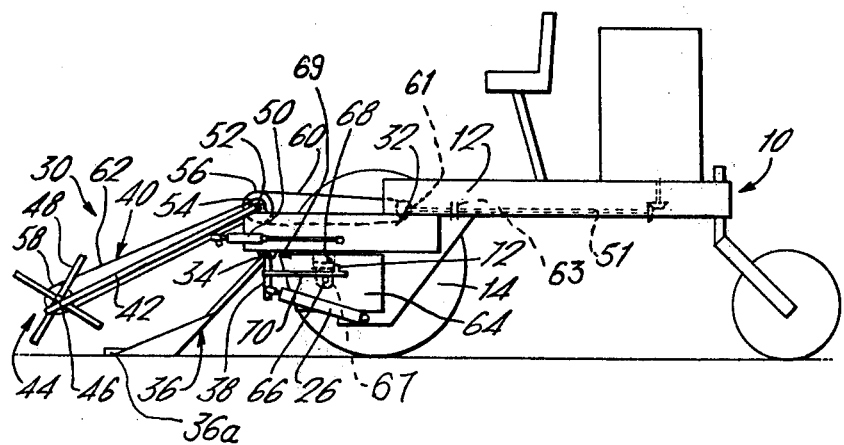
FIG. 2 is a schematic elevation of the swather of FIG. 1 with a rock picking attachment in accordance with the present invention attached thereto.

Referring now to FIG. 2 there is illustrated a rock picking attachment 30 in accordance with the present invention mounted on the vehicle 10 illustrated in FIG. 1. The attachment includes a pair of channels 32 (one shown) that are secured to opposite sides of the vehicle 10 between the wheels 14 and beneath platform 12. The channels 32 may be interconnected, if desired, in any convenient manner to provide a unit that can be mounted on the vehicle in the same way as the swather header.

A shaft 34 extends from one channel 32 to the other and is journalled, at its opposite ends on respective ones of such channels for rotation about an axis extending transversely to the direction of travel of the vehicle. A fork table 36 is mounted on the shaft 34 for rotation therewith. Table 36 includes a plurality of transversely spaced apart tines 36a that will support the rocks to be picked but will allow dirt to fall therethrough. As can be seen from FIG. 2 the fork table is of generally scoop like construction with a forward portion arranged to lie flat on, and skim over, the ground surface 1. Various fork tables of this nature are known in the prior art and accordingly the particular structural details of the table will not be further described.

An arm 38 is secured to shaft 36 at respective opposite ends thereof and depend downwardly therefrom. Each arm is in turn pivotally connected, adjacent its free end, to an end of an hydraulic cylinder 26. The hydraulic cylinders 26 are part of the vehicle and normally serve to lift the swather header. The other ends of cylinders 26 are pivotally connected to the frame of the vehicle. Thus, actuation of cylinders 26 will act through arms 38 to pivot shaft 34 and consequently to lift and lower the fork table 36. The table 36 is shown, in FIG. 2, in its lowered or picking position.

Attachment 30 also includes a reel assembly 40. Assembly 40 includes two arms 42 positioned adjacent the outside of respective ones of channels 32 and pivotally attached thereto for swinging movement in vertical planes. At their free ends, the arms 42 are interconnected by a reel 44 that extends transversely of the vehicle and is positioned forwardly of the fork table 36. Reel 44 includes a shaft 46 which is journalled at its opposite ends to respective ones of the arms 42 and a plurality of radially extending fingers 48. As can be seen from FIG. 2, four circumferentially spaced apart sets of fingers are used, each set being positioned at 90° from the adjacent sets. The reel fingers 48 should be relatively strong and inflexible and it has been found suitable to construct these fingers of ¾ inch diameter steel rods 12 inches in length. A center-to-center distance of 4 inches between adjacent fingers in each set has been found to be a suitable spacing.

Intermediate their ends, arms 42 are pivotally connected to the ends of respective ones of two hydraulic cylinders 50. These cylinders are a part of the vehicle and are normally used for lifting the swather reel. The opposite ends of cylinders 50 are connected to the vehicle frame. Extension of the cylinders 50 will pivot the arms 42 and consequently lift reel 44. Conversely, retraction of cylinders 50 will lower the reel 44. Reel 44 is shown in FIG. 2 in its lowered or picking position.

The reel 44 is driven by a belt and pulley arrangement from the header main drive 51 of the vehicle. This arrangement includes a jack shaft 52 mounted on one side of the attachment for rotation about the pivot axis of reel arms 42. Two pulleys 54 and 56 are mounted on the jack shaft 52 with pulley 56 being larger in diameter than pulley 54. A further pulley 58 is secured to one end of reel shaft 46. A belt 60 extends over the header main drive pulley 61 of the vehicle and over pulley 56. A further belt 62 extends around pulleys 54 and 58. Thus, operation of the header main drive 51 rotates the reel 44 through pulley 61, belt 60, pulley 56, jack shaft 52, pulley 54, belt 62 and pulley 58. Because the jack shaft is positioned on the pivot axis of arms 42 the reel can be lifted and lowered while maintaining tension on the belts 60 and 62. Additionally, the jack shaft 52 and pulleys 54 and 56 operate as a speed reducing mechanism to reduce the speed of rotation of reel 44 with respect to the header main drive. The conventional header clutch 63 of the vehicle operates to disengage the reel drive when this is desired.

Attachment 30 further includes a bucket 64 mounted on the attachment immediately behind and below shaft 34 of the fork table 36. Bucket 64 is supported on the attachment by a pair of transversely extending stub shafts 66 mounted in suitable bearings on the attachment. The stub shafts 66 are positioned forward of the centre of gravity of bucket 64 so that the bucket is urged by its own weight to rotate in a clockwise direction as seen in FIG. 2. Suitable stop blocks 69 are mounted on the channels 32 of the attachment to abuttingly engage the bucket and retain it normally in the horizontal position shown in FIG. 2.

A mechanism is provided for tipping bucket 64 to a dumping position. This consists of a pair of lugs 68 projecting laterally outwardly from the opposite sides of the bucket 64. A pair of links 70 are pivotally connected at their ends to respective ones of arms 38 intermediate shaft 34 and cylinder 26. The links are positioned to extend rearwardly from the associated arms 38 and to rest on the stub shafts 66 below the lugs 68. Each link 70 has a dog 72 projecting upwardly therefrom at a position immediately behind the adjacent lug 68 when the attachment is in the position shown in FIG. 2. Thus, by raising the links 70 in any convient manner the dogs 72 can be positioned behind lugs 68 so that the bucket will be dumped when the fork table is lifted which in turn draws the links 70 forwardly.

It is desirable that in a dumped position a vertical line through the center of gravity of the bucket 64 will pass rearwardly of the stub shafts 66 so that when the fork table 36 is lowered, the bucket will return to its horizontal position by gravity. Links 70 may be raised for dumping contents from the bucket in the manner previously described by a pull cord, cables or any other equivalent arrangement. The pull cord 71 (FIG. 4) is, of course, the simplest and has, in models actually constructed, proven eminently satisfactory.

Figure 3:
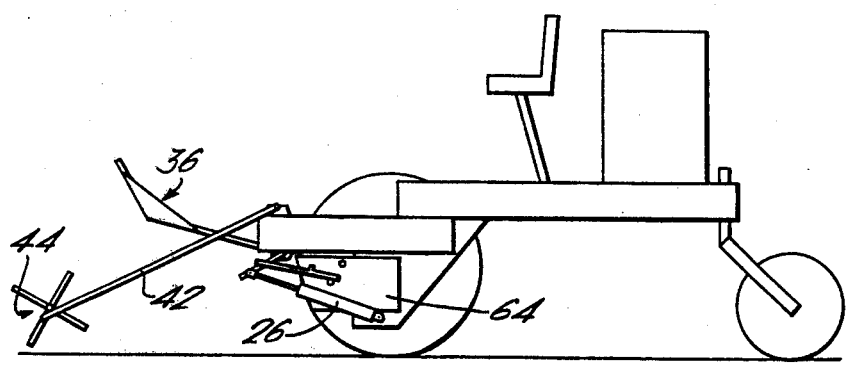
FIG. 3 is a view similar to FIG. 2 with the fork table shown in dumping position.

The operation of the present attachment will now be described with particular reference to FIGS. 2, 3 and 4.

In FIG. 2 the rock picker is shown in its operating or picking condition with the fork table 36 and the reel 44 in their lowered or picking positions. The bucket 64 is in its horizontal or normal position. As the vehicle is propelled across the ground surface 1, the fork table 36 will skim rocks from this surface. Small rocks will be engaged by the fingers of the reel 44 and will be rolled backwardly onto the fork table. These small rocks that do not project very far above the ground surface, could not be skimmed by the fork table alone although they can be rolled relatively easily. For large rocks, the reel 44 is lifted by cylinders 50. If desired, the reel drive can be disengaged by the header clutch 63.

When the fork table 36 is carrying a sufficient load of rocks, it is raised to dump the rocks into the bucket 64. This condition of the rock picker is shown in FIG. 3. It will be noted that the fork table 36 is dimensioned to pass between the reel arms 42 when lifted by extending the hydraulic cylinders 26.

After the rocks have been dumped into the bucket 64 the fork table 36 is returned to its lowered or picking position and more rocks are picked up.

When the bucket 64 has become full, the vehicle is moved to a suitable location for dumping the rocks, for example, to one side of the field. The links 70 are raised to engage dogs 72 behind lugs 68 and the hydraulic cylinders 26 are extended. This raises fork table 36 and pivots the bucket 64 to the dumping position as shown in FIG. 4 of the drawings.

Figure 4:
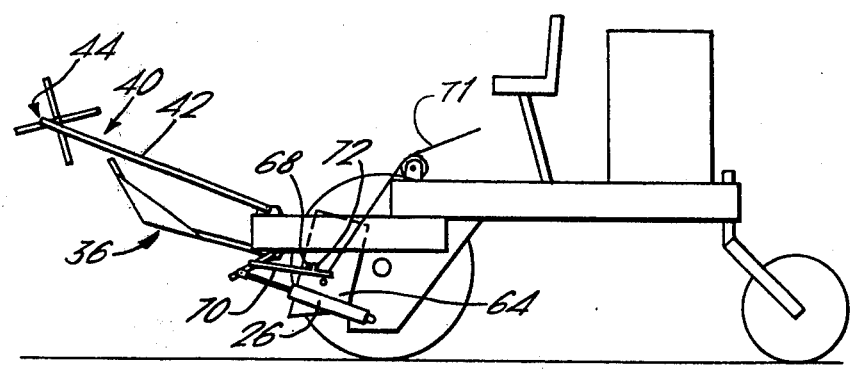
FIG. 4 is a view similar to FIGS. 2 and 3 with the reel lifted and the fork table and bucket in dumping position.

FIG. 4 also illustrates the lifted position of the reel 44. The reel is normally raised to this position for transport purposes.

From the foregoing it will be seen that there is provided a rock picking attachment for a self propelled vehicle that uses, for all of its functions, the existing hydraulic and drive systems of a conventional swather. It is however, within the scope of the present invention to provide a rock picker as a separate vehicle 10 either self propelled or towed. A towed picker can be driven, for example, by the power take off of a towing vehicle.

I claim:

1. A rock picker comprising:
   a. a mobile vehicle;
   b. a fork scoop-like table swingably mounted on said vehicle and projecting forwardly therefrom to skim rocks from a surface on which said vehicle is supported and collect the rocks on such table when said vehicle is moving in a forward direction over said surface;
   c. power means connected to said table to swing the same from a rock collecting position to a raised rock dumping position;
   d. a reel mounted on said vehicle and located at a position forwardly of the leading end of said fork scoop-like table, said reel being mounted for movement in a vertical plane to raise and lower the same and journalled for rotation about an axis transverse to the direction of travel of said vehicle, said reel having a plurality of individual fingers projecting outwardly from said axis at positions spaced circumferentially around and longitudinally therealong;
   e. power means drivingly connected to said reel for rotating the same so as to sweep said fingers rearwardly over said surface to individually engage rocks on said surface and roll said rocks rearwardly onto said fork table;
   f. a rock receiving bucket pivotally mounted on said vehicle and located at a position rearwardly of the scoop-like table to receive rocks discharged therefrom when said table is in its raised dumping position; and
   g. means interconnecting said swingably mounted table and bucket for moving the latter from a normal rock receiving position to a dumping position in response to swinging of said table to its raised position.

2. A rock picker as defined in claim 1 including power means connected to said reel assembly to controllably lower and raise said reel to respective positions wherein said fingers sweep said surface and wherein said fingers are spaced above said surface.

* * * * *